United States Patent
Colon

(10) Patent No.: US 8,315,611 B2
(45) Date of Patent: Nov. 20, 2012

(54) COMMUNICATION NETWORK FOR TRANSFERRING INFORMATION BETWEEN A MOBILE TERMINAL AND SOURCE SERVERS, AND TERMINAL AND METHOD FOR MANAGING THE TRANSFER OF INFORMATION IN SUCH A NETWORK

(75) Inventor: François Colon, Marseilles (FR)

(73) Assignee: Miyowa, Marseilles (FR)

( * ) Notice: Subject to any disclaimer, the term of this patent is extended or adjusted under 35 U.S.C. 154(b) by 1051 days.

(21) Appl. No.: 12/058,953

(22) Filed: Mar. 31, 2008

(65) Prior Publication Data

US 2009/0176498 A1    Jul. 9, 2009

Related U.S. Application Data

(60) Provisional application No. 61/025,360, filed on Feb. 1, 2008.

(30) Foreign Application Priority Data

Jan. 8, 2008 (FR) ..................................... 08 50079

(51) Int. Cl.
  *H04L 29/08* (2006.01)
(52) U.S. Cl. ............... 455/414.4; 455/414.2; 455/414.3; 455/466; 709/203; 709/206; 709/230; 370/352; 370/401; 370/466
(58) Field of Classification Search ............... 455/412.1, 455/412.2, 414.1, 414.2, 414.3, 414.4, 466, 455/566; 709/203, 204, 206, 227, 230; 370/328, 370/338, 352, 400, 401
See application file for complete search history.

(56) References Cited

U.S. PATENT DOCUMENTS

| 4,918,588 | A | 4/1990 | Barrett et al. |
| 5,870,605 | A | 2/1999 | Bracho et al. |
| 5,991,407 | A | 11/1999 | Murto |

(Continued)

FOREIGN PATENT DOCUMENTS

EP    0915590 A2    5/1999

(Continued)

OTHER PUBLICATIONS

Cheddad, Abbas et al.; "Digital Image Steganography: Survey and Analysis of Current Methods;" Signal Processing, Elsevier Science, vol. 90, No. 3, Publishers B.V. Amsterdam, NL, XP026748102, ISSN: 0165-1684, Sep. 6, 2009; pp. 727-752.

(Continued)

*Primary Examiner* — Anthony Addy
(74) *Attorney, Agent, or Firm* — Harness, Dickey & Pierce, P.L.C.

(57) ABSTRACT

A communication network includes a mobile terminal designed to receive information in a target format, source servers designed to deliver information in source formats, and an intermediate server that is independent of the source servers. Information destined for the mobile terminal goes through the intermediate server. The intermediate server is designed to receive information in the source formats from the source servers, convert to the target format the information received in the source formats, transmit the information in the target format to the mobile terminal, analyze an initial request sent by the mobile terminal, use a memory zone of the intermediate server to identify one of the source servers in response to the initial request, and transmit a request relay to the identified source server to receive information in source formats from the identified source server.

25 Claims, 5 Drawing Sheets

U.S. PATENT DOCUMENTS

| | | | |
|---|---|---|---|
| 6,377,691 | B1 | 4/2002 | Swift et al. |
| 6,434,600 | B2 | 8/2002 | Waite et al. |
| 6,504,480 | B1 | 1/2003 | Magnuson et al. |
| 6,816,970 | B2 | 11/2004 | Morgan et al. |
| 6,912,658 | B1 | 6/2005 | Glogau et al. |
| 7,032,030 | B1 | 4/2006 | Codignotto |
| 7,039,189 | B1 | 5/2006 | Kienzle et al. |
| 7,155,607 | B2 | 12/2006 | Yokota et al. |
| 7,350,076 | B1 | 3/2008 | Young et al. |
| 7,353,016 | B2 | 4/2008 | Roundtree et al. |
| 7,389,324 | B2 | 6/2008 | Masonis et al. |
| 7,527,728 | B2 | 5/2009 | Jackson |
| 7,619,584 | B2 | 11/2009 | Wolf |
| 7,685,236 | B1 | 3/2010 | Harik et al. |
| 7,698,370 | B1 | 4/2010 | Hall |
| 7,995,506 | B2 * | 8/2011 | Kalish .......................... 370/310 |
| 8,090,945 | B2 | 1/2012 | Singhal |
| 8,095,658 | B2 * | 1/2012 | Ashley et al. ................. 709/226 |
| 8,099,770 | B2 | 1/2012 | Makkinejad |
| 8,196,186 | B2 | 6/2012 | Mityagin et al. |
| 2001/0013050 | A1 | 8/2001 | Shah |
| 2001/0014868 | A1 | 8/2001 | Herz et al. |
| 2002/0010746 | A1 | 1/2002 | Jilk et al. |
| 2003/0054810 | A1 | 3/2003 | Chen et al. |
| 2003/0073440 | A1 | 4/2003 | Mukherjee et al. |
| 2003/0105873 | A1 * | 6/2003 | Ye et al. ........................ 709/230 |
| 2003/0208557 | A1 | 11/2003 | Higbee et al. |
| 2003/0225843 | A1 | 12/2003 | Sakata |
| 2003/0232618 | A1 | 12/2003 | Le et al. |
| 2004/0052238 | A1 | 3/2004 | Borella et al. |
| 2004/0056901 | A1 | 3/2004 | March et al. |
| 2004/0086100 | A1 | 5/2004 | Moore et al. |
| 2004/0143632 | A1 | 7/2004 | McCarty |
| 2004/0143633 | A1 | 7/2004 | McCarty |
| 2004/0172455 | A1 | 9/2004 | Green et al. |
| 2004/0177119 | A1 | 9/2004 | Mason et al. |
| 2004/0266402 | A1 | 12/2004 | Schavitz |
| 2005/0021526 | A1 * | 1/2005 | Bazot et al. .................... 707/100 |
| 2005/0030913 | A1 | 2/2005 | Roy |
| 2005/0044152 | A1 | 2/2005 | Hardy et al. |
| 2005/0055443 | A1 | 3/2005 | Tosey et al. |
| 2005/0080864 | A1 | 4/2005 | Daniell |
| 2005/0120077 | A1 | 6/2005 | Albornoz et al. |
| 2005/0144587 | A1 | 6/2005 | Bryant |
| 2005/0198173 | A1 | 9/2005 | Evans |
| 2005/0205660 | A1 | 9/2005 | Munte |
| 2005/0243854 | A1 | 11/2005 | Ward |
| 2005/0267980 | A1 | 12/2005 | Warren et al. |
| 2005/0273843 | A1 | 12/2005 | Shigeeda |
| 2005/0289180 | A1 | 12/2005 | Pabla et al. |
| 2006/0009243 | A1 | 1/2006 | Dahan et al. |
| 2006/0014530 | A1 | 1/2006 | Denenberg et al. |
| 2006/0085355 | A1 | 4/2006 | Coley et al. |
| 2006/0129643 | A1 | 6/2006 | Nielson et al. |
| 2006/0142880 | A1 | 6/2006 | Deen et al. |
| 2006/0168037 | A1 | 7/2006 | Audu et al. |
| 2006/0194596 | A1 | 8/2006 | Deng |
| 2006/0195506 | A1 | 8/2006 | Deng |
| 2006/0218234 | A1 | 9/2006 | Deng et al. |
| 2006/0240824 | A1 | 10/2006 | Henderson et al. |
| 2006/0259632 | A1 | 11/2006 | Crawford et al. |
| 2006/0265510 | A1 | 11/2006 | Warren et al. |
| 2006/0271859 | A1 | 11/2006 | Gorzela |
| 2007/0038974 | A1 | 2/2007 | Albahari et al. |
| 2007/0042754 | A1 | 2/2007 | Bajikar et al. |
| 2007/0130277 | A1 | 6/2007 | Roskind et al. |
| 2007/0136814 | A1 | 6/2007 | Lee et al. |
| 2007/0174810 | A1 | 7/2007 | Hockenberry et al. |
| 2007/0192410 | A1 | 8/2007 | Liversidge et al. |
| 2007/0233859 | A1 | 10/2007 | Zhao et al. |
| 2007/0239866 | A1 | 10/2007 | Cox et al. |
| 2007/0250496 | A1 | 10/2007 | Halliday et al. |
| 2007/0253340 | A1 | 11/2007 | Varney et al. |
| 2007/0266076 | A1 | 11/2007 | Cox et al. |
| 2007/0282963 | A1 | 12/2007 | Mo et al. |
| 2008/0040443 | A1 | 2/2008 | Agrawal |
| 2008/0120387 | A1 | 5/2008 | Werndorfer et al. |
| 2008/0126492 | A1 | 5/2008 | Guidi et al. |
| 2008/0133674 | A1 | 6/2008 | Knauerhase et al. |
| 2008/0134295 | A1 | 6/2008 | Bailey et al. |
| 2008/0177878 | A1 | 7/2008 | Pierce |
| 2008/0183846 | A1 | 7/2008 | Colon |
| 2008/0235798 | A1 | 9/2008 | Lu |
| 2008/0244014 | A1 | 10/2008 | Britton et al. |
| 2008/0267091 | A1 | 10/2008 | Parkkinen et al. |
| 2008/0288649 | A1 | 11/2008 | Burckart et al. |
| 2008/0299953 | A1 | 12/2008 | Rao |
| 2009/0031244 | A1 | 1/2009 | Brezina et al. |
| 2009/0068989 | A1 | 3/2009 | Colon |
| 2009/0083732 | A1 | 3/2009 | Shen et al. |
| 2009/0112988 | A1 | 4/2009 | Colon |
| 2009/0113007 | A1 | 4/2009 | Colon |
| 2009/0125591 | A1 * | 5/2009 | Kirkpatrick .................. 709/206 |
| 2009/0176498 | A1 | 7/2009 | Colon |
| 2009/0187634 | A1 | 7/2009 | Colon |
| 2009/0210507 | A1 | 8/2009 | Haverkos |
| 2010/0055659 | A1 | 3/2010 | Rogers et al. |
| 2010/0057732 | A1 | 3/2010 | O'Sullivan et al. |
| 2010/0077018 | A1 | 3/2010 | Acharya et al. |
| 2010/0179982 | A1 | 7/2010 | Colon |
| 2010/0199340 | A1 | 8/2010 | Jonas et al. |
| 2010/0217809 | A1 | 8/2010 | Vymenets et al. |
| 2010/0228790 | A1 | 9/2010 | Colon |
| 2010/0293376 | A1 | 11/2010 | Colon |
| 2011/0001603 | A1 | 1/2011 | Willis |
| 2011/0016512 | A1 | 1/2011 | Colon |

FOREIGN PATENT DOCUMENTS

| | | | |
|---|---|---|---|
| EP | 1587239 | A1 | 10/2005 |
| EP | 1643744 | A1 | 4/2006 |
| EP | 2053806 | A1 | 4/2009 |
| FR | 2868177 | A1 | 9/2005 |
| WO | WO-2004/059447 | A2 | 7/2004 |
| WO | WO-2006/084183 | A1 | 8/2006 |

OTHER PUBLICATIONS

European Search Report EP07291423, dated Mar. 31, 2008.
French Search Report for Application No. FR 0706244, dated Feb. 19, 2008.
French Search Report for Application No. FR 0850285, dated Sep. 15, 2008.
Kalika, Gabrielle; www.mobilemarketer.com; "Miyowa launches mobile social networking application;" Aug. 11, 2008; 2 pgs.
Ngo, Dong; http://news.cnet.com; "Miyowa's InTouch5: Cell phone contact evolved;" Aug. 5, 2008: 2 pgs.
Preliminary Search Report for French Application 0901849, dated Feb. 19, 2010.
Radek Kantor; "IV054—Chapter 13: Steganography and Watermarking;"Extract from the Internet, XP002569385, Oct. 17, 2003; 17 sheets of 34 slides.
Rishi, Lata et al; "Presence and Its Effect on Network;" Personal Wireless Communications, ICPWC 2005, 2005 IEEE International Conference on New Delhi, India, Jan. 23-25, 2005, Piscataway, New Jersey; XP010798582, Jan. 23, 2005; pp. 368-372.
www.miyowa.com; "Miyowa launches Move Messenger;" Jul. 25, 2006; 2 pgs.

* cited by examiner

COMMUNICATION NETWORK FOR TRANSFERRING INFORMATION BETWEEN A MOBILE TERMINAL AND SOURCE SERVERS, AND TERMINAL AND METHOD FOR MANAGING THE TRANSFER OF INFORMATION IN SUCH A NETWORK

PRIORITY

The present application claims priority to French Patent Application No.: FR 08/50079 filed on Jan. 8, 2008; and U.S. Provisional Application No. 61/025,360 filed on Feb. 1, 2008; the entire contents of each of the above Applications are incorporated herein by reference.

FIELD OF THE INVENTION

The invention relates to the general technical field of telecommunications. More specifically, the invention relates to a communication network which allows to exchange information such as requests between a mobile terminal and a plurality of source servers. It also relates to a method for managing the transfer of information in such a communication network, and to a terminal capable of exchanging information in such a network.

BACKGROUND OF THE INVENTION

Mobile terminals—such as mobile telephones, laptops, PDAs, BlackBerry® devices—are generally equipped with a certain number of functionalities allowing for example to check e-mails (MAIL), to open an instant messaging session (IM), or to communicate on a blog (BLOG). Each of these functionalities is implemented by a specific computer application which is integrated in the mobile terminal.

FIG. 1 shows various screenshots of a screen of a mobile terminal TM upon activation of these functionalities. Initially, the screen displays the various functionalities (IM, MAIL, BLOG or other) in the form of strips, icons, rolling menus, etc. The user can select the desired functionality by means of the navigation keys on his keypad.

In the case where the user selects the instant messaging function (IM), a specific computer application (AIM®, ICQ®, Windows Live Messenger®, Yahoo!®, Messenger®, etc.) is launched so that the mobile terminal TM can connect to an instant messaging server IM (Microsoft Live Communication Server®, Sun Java System Instant Messaging®, Jabberd®, Groupwise Messenger®, etc.) and can use the instant messaging services traditionally offered: conversation Svc1, contact list management Svc2, rule management Svc3, etc. These services Svc1, Svc2, Svc3 are displayed on the screen of the mobile terminal TM in the form of strips, icons, rolling menus, etc. The user can then select the desired service by means of the navigation keys on his keypad.

By way of example, when the user actuates the conversation service Svc1, the server IM sends to the mobile terminal TM the user's contact list (or "buddy list"), said list being displayed on the screen of said terminal.

In the case where the user selects the e-mail function (MAIL), a new specific computer application (Google Mail®, SFR Mail®, Orange Mail®, Outlook®, etc.) is launched so that the mobile terminal TM can connect to a MAIL server (SendMail®, Zimbra®, Lotus®, Microsoft Exchange Server®, etc.) and can use the e-mail services traditionally offered: receive/send e-mail Svc1, address book management Svc2, message rules Svc3, etc. These services are displayed on the screen of the mobile terminal TM in the same way as for the IM function described above.

By way of example, when the user actuates the receive/send e-mail service Svc1, the server MAIL sends to the mobile terminal TM the user's inbox, the list of e-mails being displayed on the screen of said terminal.

It will be understood that a similar mode of operation is implemented when the user selects the BLOG function or another function.

The computer applications which allow to launch the functions IM, MAIL, BLOG or others are specific programs which have different lines of code depending on the functionality. Thus, the greater the number of functionalities offered, the more the mobile terminal will have to integrate different computer applications capable of implementing them. This situation is a disadvantage not only for developers (cumbersome programming which takes a lot of time and effort), but also for users (the greater the number of functionalities offered, the higher the price of the mobile terminal).

FIG. 2 schematically shows a communication network which is customarily used in mobile telephony but which also applies to other similar mobile terminals TM.

As soon as the user selects a functionality IM, MAIL, BLOG or other and launches the associated computer application, his mobile terminal TM connects to the corresponding source server SS1, SS2, SS3, SS4. All the information exchanged between the mobile terminal TM and the source servers SS1, SS2, SS3, SS4 passes through dedicated information channels, respectively Ci1, Ci2, Ci3 or Ci4.

The information passes through these information channels according to specific protocols (HTTP, IP, SMTP, etc.) which define the rules of communication between the mobile terminals TM and the source servers SS1, SS2, SS3 or SS4. The source servers and the mobile terminals must be able to exchange their information on the basis of a common language (or common format) such as: HTML, XML, etc. Since the nature of the information exchanged between the mobile terminal and the source servers may vary, said mobile terminal must be capable of implementing the different protocols so as to "understand" the information that it receives and to display said information on its screen in a manner that is intelligible for the user. Likewise, the source servers SS1, SS2, SS3 or SS4 must be capable of understanding the requests transmitted by the mobile terminal TM so as to be able to process them correctly.

The communication networks known in the art are therefore complex since they multiply the number of information channels between the mobile terminal and the various source servers, and also the number of communication protocols allowing the exchange of information in said channels. This latter aspect is a particular constraint for developers and operators, since many lines of code have to be integrated in the mobile terminals and the source servers.

In order to overcome this disadvantage, communication networks are known in which all the information/requests transmitted to/by the mobile terminal TM are in a single target format. In this way, it is sufficient for the mobile terminal TM to integrate only the communication protocol compatible with this target format in order to "understand" the information that it receives and to display said information on its screen in a manner that is intelligible for the user.

However, the source servers SS1, SS2, SS3, SS4 store their information in source formats that are specific to them. Generally, this information is in the form of a succession of lines of code which are incomprehensible to the user. It is therefore necessary to manage the format of the information transmitted by the source servers SS1, SS2, SS3, SS4 so that said information can be understood by the mobile terminal TM and the user.

Likewise, when the mobile terminal TM transmits requests to the source servers SS1, SS2, SS3, SS4, said requests are in the target format. It is therefore necessary to manage the format of the requests received by the source servers SS1, SS2, SS3, SS4 so that said requests can be processed by the latter.

In order to manage these different formats, the source servers must therefore be designed to convert:

to the target format the information that they transmit to the mobile terminal;

to the source format the requests that they receive from the mobile terminal.

Although effective, these computer applications which allow to manage formats are complex to implement, all the more so since they can vary depending on the source servers. Moreover, these computer applications may need to evolve to take account of the new source formats and/or target formats used in the communication networks. As a result, the integrations and/or modifications of these computer applications are long and expensive for the operators, since a large number of management protocols and software/hardware items have to be taken into account.

Thus, there remains a need to address the aforementioned drawbacks, and to improve current methods and systems.

SUMMARY OF THE INVENTION

In a first aspect, there is provided a communication network for transferring information between a mobile terminal and a plurality of source servers, comprising:

at least one mobile terminal (TM) designed to receive information in a target format, source servers (SS1, SS2, SS3, SS4) designed to deliver information in source formats, wherein:

an intermediate server (SPV), which is independent of the source servers (SS1, SS2, SS3, SS4), is arranged between the mobile terminal (TM) and said source servers so that the information destined for said mobile terminal goes through said intermediate server, the intermediate server (SPV) is designed to receive information in the source formats from the source servers (SS1, SS2, SS3, SS4), the intermediate server (SPV) is designed to convert to the target format the information received in the source formats, and the intermediate server (SPV) is designed to transmit the information in the target format to the mobile terminal (TM).

In certain embodiments, in the network of the invention:

the mobile terminal (TM) is designed to transmit initial requests to the intermediate server (SPV) which allows to receive information available in the source servers (SS1, SS2, SS3, SS4), said initial requests being in the target format, and the intermediate server (SPV) is designed to:

analyze the initial requests received and identify the source servers (SS1, SS2, SS3, SS4) in which the requested information is available, and transmit relay requests to the source servers (SS1, SS2, SS3, SS4) in order to receive the requested information, said relay requests being transmitted in source formats compatible with said source servers.

In certain embodiments, in the network of the invention:

the mobile terminal (TM) is designed to transmit initial requests which allow to receive information available in the source servers (SS1, SS2, SS3, SS4), said initial requests being in the target format, the source servers (SS1, SS2, SS3, SS4) are designed to process directly the initial requests in the target format transmitted by the mobile terminal (TM), and the intermediate server (SPV) is designed to intercept said initial requests and to redirect them as such to said source servers.

In certain embodiments, the mobile terminal (TM) integrates a computer application for instant messaging, the target format being a format used for instant messaging, all the information and requests exchanged between said mobile terminal and the intermediate server (SPV) going only through one information channel (C11) used for instant messaging.

In certain embodiments, all the information and requests exchanged between the mobile terminal (TM) and the intermediate server (SPV) are in HTML format.

In certain embodiments, the mobile terminal (TM) is designed to display on its screen the initial requests as contacts in the list of instant messaging contacts.

In certain embodiments, the initial requests displayed on the screen of the mobile terminal (TM) are associated with predefined text messages, the intermediate server (SPV) comprising a memory zone in which these text messages are associated with the relay requests designed to be transmitted to the source servers (SS1, SS2, SS3, SS4) in order to receive the requested information.

In certain embodiments, the intermediate server (SPV) is designed to store in its memory the chronology of the different initial requests transmitted by the mobile terminal (TM) so that one and the same text message can be associated with different relay requests according to the point in time at which said initial requests are transmitted by said mobile terminal.

In certain embodiments, the intermediate server (SPV) is designed to transmit to the mobile terminal (TM), at the same time as the requested information, a list of initial requests which is designed to be displayed in the form of text messages on the screen of said mobile terminal.

In certain embodiments, in the network of the invention:

the mobile terminal (TM) is designed to transmit an initial presence request to the intermediate server (SPV), said initial presence request containing identification information of the user of said terminal, and the intermediate server (SPV) is designed to analyze the identification information of the user and, after verification, to authorise the connection to the mobile terminal (TM) and to allocate a memory space in which it will store a copy of the information and requests that will circulate.

In certain embodiments, in the network of the invention:

the intermediate server (SPV) is designed to transmit relay presence requests to the source servers (SS1, SS2, SS3, SS4), said relay presence requests being in a source format associated with the source servers and containing identification information of the user of the mobile terminal (TM), and the source servers (SS1, SS2, SS3, SS4) are designed to analyze the identification information of the user and, after verification, to authorise the connection to the intermediate server (SPV).

In certain embodiments, the relay presence requests transmitted by the intermediate server (SPV) are similar to the initial presence request transmitted by the mobile terminal (TM) so that said intermediate server is perceived by the source servers (SS1, SS2, SS3, SS4) as being said mobile terminal.

In another aspect, the invention provides a method for managing the transfer of information in the communication network for managing the transfer of information according to any one of the preceding claims, in which:

at least one mobile terminal (TM) is designed to receive information in a target format, and source servers (SS1, SS2, SS3, SS4) are designed to deliver information in source formats, wherein:

the mobile terminal connects to an intermediate server (SPV) which is independent of the source servers (SS1, SS2, SS3, SS4), the intermediate server (SPV) connects to one of the source servers (SS1, SS2, SS3, SS4) so that the information destined for the mobile terminal (TM) passes via said intermediate server, the source server (SS1, SS2, SS3, SS4) to which the intermediate server (SPV) is connected transmits information in the source format to the latter, the intermediate server (SPV) converts to the target format the information received in the source format, and the intermediate server transmits the information in the target format to the mobile terminal.

In certain embodiments, in the method of the invention:

the mobile terminal (TM) transmits an initial request to the intermediate server (SPV), which allows to receive information available in the source servers (SS1, SS2, SS3, SS4), said initial request being in the target format, and the intermediate server (SPV):

analyzes the initial request received and identifies the source server (SS1, SS2, SS3, SS4) in which the requested information is available, and transmits a relay request to the identified source server (SS1, SS2, SS3, SS4) in order to receive the requested information, said relay request being transmitted in a source format compatible with said identified source server.

In certain embodiments, in the method of the invention:

the mobile terminal (TM) transmits an initial request to the intermediate server (SPV), which allows to receive information available in a source server (SS1, SS2, SS3, SS4), said initial request being in the target format, and the source server (SS1, SS2, SS3, SS4) processes directly the initial request in the target format transmitted by the mobile terminal (TM), the intermediate server (SPV) intercepting said initial request and redirecting it as such to said source server.

In certain embodiments, the mobile terminal (TM) integrates a computer application for instant messaging, the target format being a format used for instant messaging, all the information and requests exchanged between said mobile terminal and the intermediate server (SPV) passing only through one information channel (Ci1) used for instant messaging.

In certain embodiments, all the information and requests exchanged between the mobile terminal (TM) and the intermediate server (SPV) are in HTML format.

In certain embodiments, the initial requests are displayed on the screen of the mobile terminal (TM) as contacts in the list of instant messaging contacts.

In certain embodiments, the transmission of an initial request is carried out by inputting a predefined text message associated with said request in the text writing zone of the mobile terminal (TM), said text message being transmitted to the intermediate server (SPV).

In certain embodiments, the initial requests displayed on the screen of the mobile terminal (TM) are associated with predefined text messages, the intermediate server (SPV) associating these text messages with the relay requests designed to be transmitted to the source servers (SS1, SS2, SS3, SS4) in order to receive the requested information.

In certain embodiments, the chronology of the different initial requests transmitted by the mobile terminal (TM) is stored in a memory in the intermediate server (SPV) so that one and the same text message can be associated with different relay requests according to the point in time at which said initial requests are transmitted by said mobile terminal.

In certain embodiments, the intermediate server (SPV) transmits to the mobile terminal (TM), at the same time as the requested information, a list of initial requests which is designed to be displayed in the form of text messages on the screen of said mobile terminal.

In certain embodiments:

when the user of the mobile terminal (TM) wishes to connect to the intermediate server (SPV), said terminal transmits beforehand an initial presence request to said intermediate server, said initial presence request containing identification information of the user of said terminal, the intermediate server (SPV) analyzes the identification information of the user and, after verification, authorises the connection to the mobile terminal (TM) and allocates a memory space in which it will store a copy of the information and requests that will circulate.

In certain embodiments:

in order to establish a connection between the intermediate server (SPV) and a source server (SS1, SS2, SS3), said intermediate server transmits beforehand a relay presence request to said source server, said relay presence request being in a source format associated with said source server and containing identification information of the user of the mobile terminal (TM), the source server (SS1, SS2, SS3, SS4) analyzes the identification information of the user and, after verification, authorises the connection to the intermediate server (SPV).

In yet another aspect, the invention provides a mobile terminal equipped with a screen and integrating a computer application for instant messaging, this terminal being designed to exchange information with a plurality of source servers in a communication network according to any one of claims 1 to 12, characterised in that it is designed to display requests on its screen as contacts in its list of instant messaging contacts, said requests being associated with predefined text messages.

DETAILED DESCRIPTION OF CERTAIN PREFERRED EMBODIMENTS OF THE INVENTION

Figure 1:
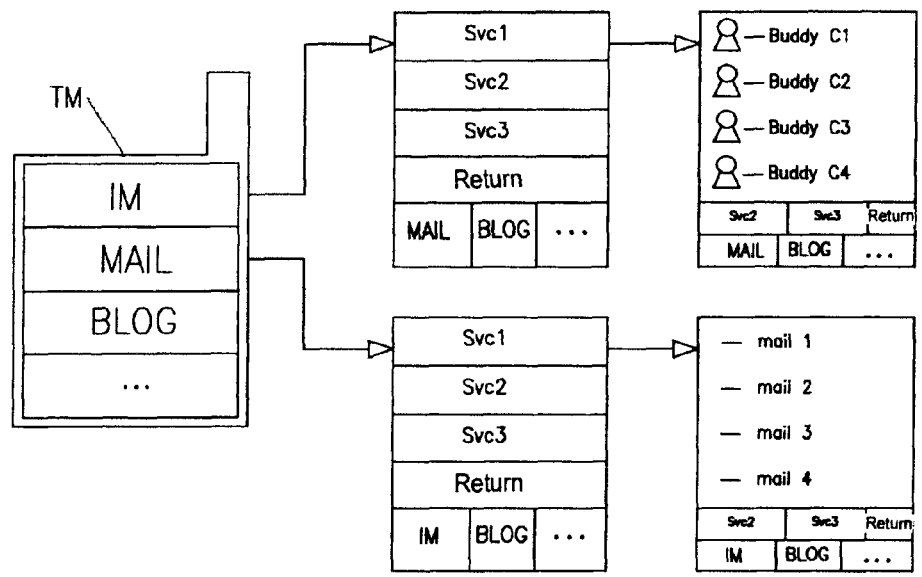
FIG. 1 schematically shows different screenshots of a screen of a mobile terminal known in the art upon activation of the functionalities, FIG. 2 schematically shows a communication network known in the art used in mobile telephony, FIG. 3 schematically shows an exemplary communication network according to the invention, the intermediate server being connected to the server MAIL, FIG. 4 schematically shows an exemplary communication network according to the invention, the intermediate server being connected to the server IM.
Figure 2:
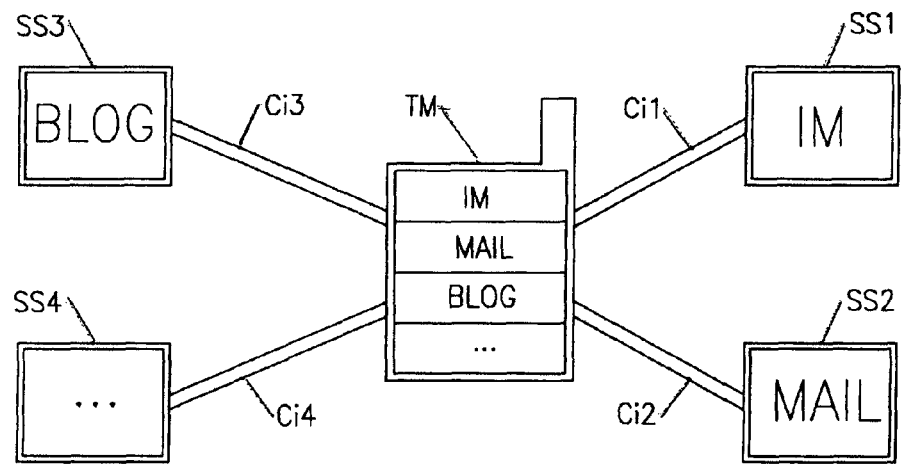

Faced with the existing disadvantages known in the art, a first object of the invention is to reduce the number of computer applications that need to be integrated in a mobile terminal in order to implement all the functionalities customarily offered to a user: IM, MAIL, BLOG or others.

Another object of the invention is to simplify the communication networks known in the art in such a way as to simplify the exchanges of information and requests between mobile terminals and source servers.

Another object of the invention is to simplify the management of the formats of the information such as requests exchanged between mobile terminals and a plurality of source servers.

In one aspect, the invention provides a configuration in which the intermediate server is responsible for managing the format of the information exchanged between the mobile terminal and the different source servers. As a result, neither the mobile terminal nor the source servers have to integrate the complex computer applications mentioned above in the Background of the Invention.

More specifically, in one aspect, the invention provides a communication network for transferring information between a mobile terminal and a plurality of source servers, comprising:

at least one mobile terminal designed to receive information in a target format, source servers designed to deliver information in source formats, an intermediate server, which is independent of the source servers, arranged between the mobile terminal and said source servers so that the information destined for said mobile terminal passes via said intermediate server, the intermediate server being designed to receive information in the source formats from the source servers, the intermediate server being designed to convert to the target format the information received in the source formats, and the intermediate server being designed to transmit the information in the target format to the mobile terminal.

According to one advantageous feature of the invention, which allows to effectively manage requests transmitted by the mobile terminal, while avoiding the need for the mobile terminal or the source servers to deal with any formatting problem, the mobile terminal is designed to transmit initial requests to the intermediate server, which allows to receive information available in the source servers, said initial requests being in the target format, and the intermediate server is designed to:

analyze the initial requests received and identify the source servers in which the requested information is available, and transmit relay requests to the source servers in order to receive the requested information, said relay requests being transmitted in source formats compatible with said source servers.

In one particular embodiment:

the mobile terminal is designed to transmit initial requests, which allows to receive information available in the source servers, said initial requests being in the target format, the source servers are designed to process directly the initial requests in the target format transmitted by the mobile terminal, and the intermediate server is designed to intercept said initial requests and to redirect them as such to said source servers.

According to another advantageous feature of the invention, which allows to use only one instant messaging protocol for exchanging the information and requests between the mobile terminal and the intermediate server, said mobile terminal integrates a computer application for instant messaging, the target format being a format used for instant messaging, all the information and requests passing only through one information channel used for instant messaging.

Preferably, all the information and requests exchanged between the mobile terminal and the intermediate server are in HTML format, that is to say a format commonly used in communication networks.

According to yet another advantageous feature of the invention, which simplifies the displaying of the initial requests, the mobile terminal is designed to display the initial requests on its screen as contacts in the list of instant messaging contacts.

According to yet another feature of the invention, which allows to effectively and rapidly analyze the initial requests received by the intermediate server, said initial requests displayed on the screen of the mobile terminal are associated with predefined text messages, said intermediate server comprising a memory zone in which these text messages are associated with the relay requests designed to be transmitted to the source servers in order to receive the requested information.

According to yet another feature of the invention, which allows to simplify the management of the initial requests, not only from the point of view of the user but also from the point of view of the intermediate server, the latter is designed to store in its memory the chronology of the different initial requests transmitted by the mobile terminal so that one and the same text message can be associated with different relay requests according to the point in time at which said initial requests are transmitted by said mobile terminal.

According to yet another feature of the invention, the intermediate server is designed to transmit to the mobile terminal, at the same time as the requested information, a list of initial requests, which is designed to be displayed in the form of text messages on the screen of said mobile terminal. As such, there is no need to store in the mobile terminal memory zone all of the initial requests likely to be transmitted. It is now the intermediate server that proposes these requests to the mobile terminal according to the information transmitted.

According to yet another advantageous feature of the invention, which allows to effectively control the connection between the mobile terminal and the intermediate server:

the mobile terminal is designed to transmit an initial presence request to the intermediate server, said initial presence request containing identification information of the user of said terminal, and the intermediate server is designed to analyze the identification information of the user and, after verification, to authorise the connection to the mobile terminal and to allocate a memory space in which it will store a copy of the information and requests that will circulate.

According to yet another advantageous feature of the invention, which allows to effectively control the connection between the intermediate server and the different source servers:

the intermediate server is designed to transmit relay presence requests to the source servers, said relay presence requests being in a format compatible with said source servers and containing identification information of the user of the mobile terminal, and the source servers are designed to analyze the identification information of the user and, after verification, to authorise the connection to the intermediate server.

In certain embodiments, in order to avoid modifying the identification protocols integrated in existing source servers, the relay presence request transmitted by the intermediate server is advantageously similar to the initial presence request transmitted by the mobile terminal so that said intermediate server is perceived by the source servers as being said mobile terminal.

Another aspect of the invention relates to a method for managing the transfer of information in the above communication network, in which:

at least one mobile terminal is designed to receive information in a target format, source servers are designed to deliver information in source formats, the mobile terminal connects to an intermediate server which is independent of the source servers, the intermediate server connects to one of the source servers so that the information intended for the mobile terminal goes through said intermediate server, the source server to which the intermediate server is connected transmits information to the latter in the source format, the information received in the source format is converted by the intermediate server into the target format, and the intermediate server transmits the information in the target format to the mobile terminal.

Yet another aspect of the invention relates to a mobile terminal equipped with a screen and integrating a computer application for instant messaging, wherein this mobile terminal is designed to display requests on its screen as contacts in its list of instant messaging contacts, said requests being associated with predefined text messages.

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

EXEMPLIFICATION

Advantages and features of the invention can be understood further by the examples that follow, which help illustrate some of the exemplary embodiments of the present invention. It will be appreciated, however, that these examples do not limit the invention. Variations of the invention, now known or further developed, are considered to fall within the scope of the present invention as described herein and as hereinafter claimed.

Figure 3:
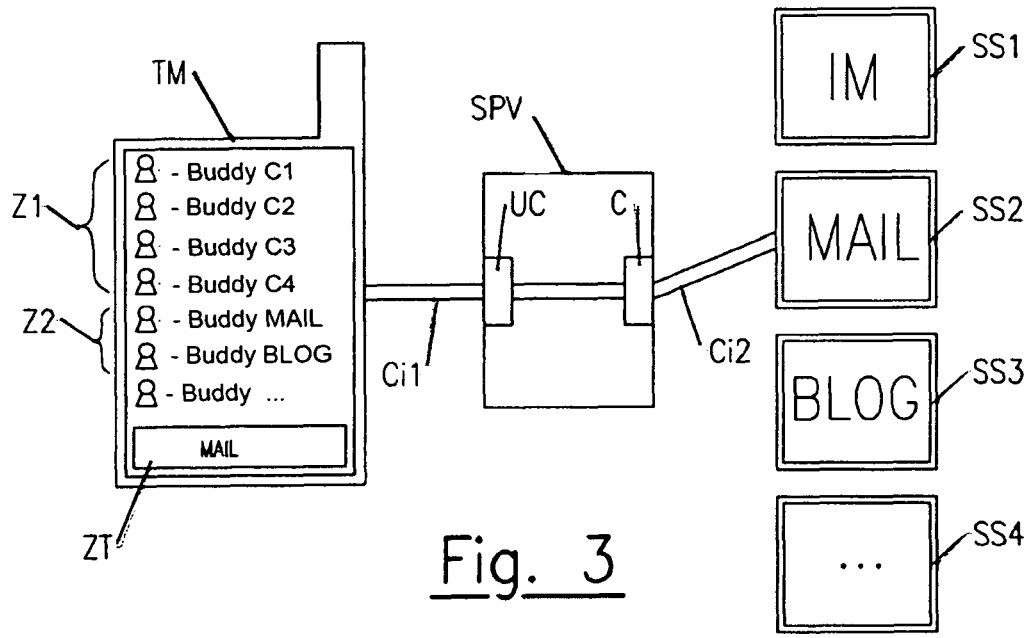
Figure 4:
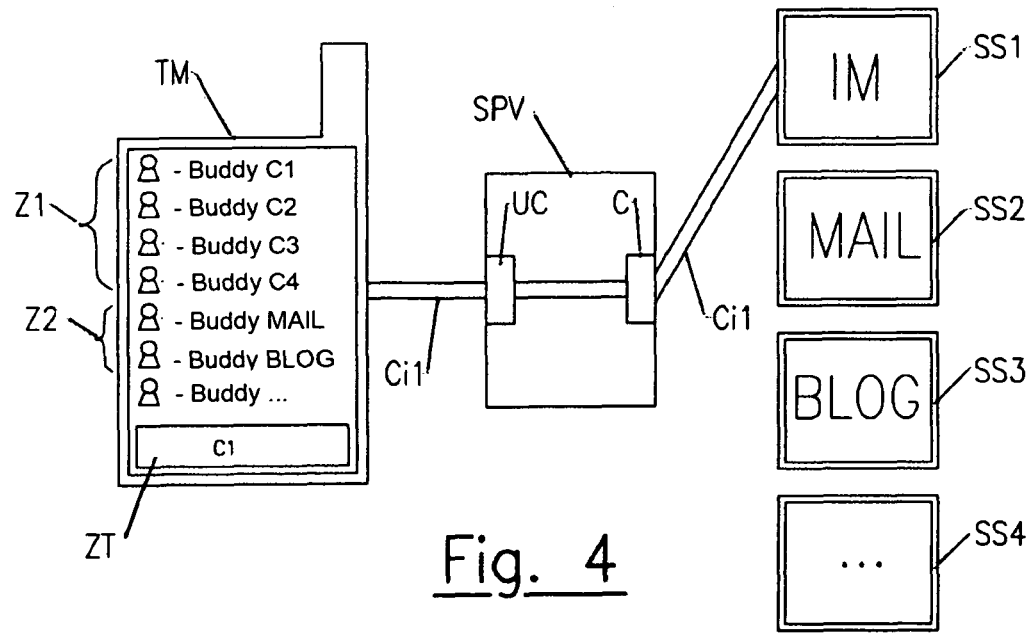

Referring to FIGS. 3 and 4, in certain embodiments, the inventive communication network comprises:

at least one mobile terminal TM designed to receive information in a target format, source servers SS1, SS2, SS3, SS4 designed to deliver information in source formats.

In certain embodiments, the mobile terminals TM used for implementing the invention may be mobile telephones, devices of the personal digital assistant (PDA) type, devices of the BlackBerry® type, a laptop computer, or any other mobile communication terminal capable of connecting to a communication network. It will be understood that the communication network of the invention is also able to function with non-mobile terminals such as desktop PCs.

In certain embodiments, the mobile terminals TM are designed to deliver requests in a target format and also to receive information which is also in the target format. In certain embodiments, in a manner well known to the person skilled in the art, they integrate conventional computer applications and are equipped with processors, controllers or any other equivalent means which allow to process the information received and to transmit requests.

In certain embodiments, the source servers SS1, SS2, SS3, SS4 are identical to those known to the person skilled in the art and used in the communication networks known in the art. In practice, these can be IM servers SS1: Microsoft Live Communication Server®, Sun Java System Instant Messaging®, Jabberd®, Groupwise Messenger®, or others; MAIL servers SS2: SendMail®, Zimbra®, Lotus®, Microsoft Exchange Server®, or others; BLOG servers SS3 or any other similar servers SS4.

In certain embodiments, the source servers SS1, SS2, SS3, SS4 are designed to deliver information and to deliver requests in source formats which are specific to them. In certain embodiments, in a manner that is well known in the art, they integrate computer applications and are equipped with processors, controllers or any other equivalent means which allow to process received requests and to deliver requested information.

In certain embodiments, the communication network comprises an intermediate server SPV which is independent of the source servers SS1, SS2, SS3, SS4. In certain embodiments, this intermediate server SPV is arranged between the mobile terminal TM and the source servers SS1, SS2, SS3, SS4 so that the information destined for said mobile terminal and optionally the requests transmitted by the latter go through said intermediate server. In practice, the intermediate server SPV can be a computer or a computer program designed to propose certain services to the mobile terminals TM which connect thereto.

In certain embodiments, when the user of the mobile terminal TM wishes to connect to the intermediate server SPV, a computer application placed in said terminal transmits an initial presence request to said server. This initial presence request can contain identification information of the user of the mobile terminal TM, such as the identification of said user and/or a password which are necessary in order for the intermediate server SPV to authorise the connection. This is a conventional management system for access authorisation which is processed directly in the central processing unit UC of the intermediate server SPV. In certain embodiments, the initial presence request contains a single information item which allows to uniquely identify the user. In certain embodiments, after analysis and verification of the identification information of the user, the intermediate server SPV authorises the connection and allocates a memory space in which it will store a copy of the information and requests that will circulate. In certain embodiments, the analysis and verification of the identification information of the user are carried out via a computer application placed in the central processing unit UC. Although its presence is desirable, this preliminary identification step is not required for establishing the connection between the mobile terminal TM and the intermediate server SPV.

In certain embodiments, the information and initial requests exchanged between the mobile terminal TM and the intermediate server SPV go through a single information channel, according to a single protocol. This is preferably the information channel Ci1 used for instant messaging with a protocol used for instant messaging. In certain embodiments, the mobile terminal TM advantageously integrates a computer application for instant messaging so that the target format can be a format used for instant messaging, preferably the HTML format.

In certain embodiments, the mobile terminal TM transmits initial requests to said intermediate server, which allow to receive information available in the source servers SS1, SS2, SS3, SS4. For example, the initial requests may consist in requesting the different functionalities available, the different e-mail services offered, the content of an inbox, the history of conversations on a blog, etc. In certain embodiments, these initial requests may be transmitted by means of a computer application that is integrated in the mobile terminal TM or by any other equivalent means usually used by the person skilled in the art. As seen above, in certain embodiments, these initial requests are transmitted in target format and go through the single information channel Ci1 connecting the mobile terminal TM and the intermediate server SVP.

In certain embodiments, the intermediate server SVP analyzes the initial requests received and identifies the source servers SS1, SS2, SS3 or SS4 in which the requested information is available. In certain embodiments, the analysis of the initial requests and the identification of the source server are carried out in a manner known to the person skilled in the art, using processors, controllers, programs or any other equivalent software/hardware integrated in the central processing unit UC of the intermediate server SPV. In practice, the initial requests may contain a code or a code part associated with the requested information and with the source server likely to store said information (for example a URL address).

In certain embodiments, as soon as an initial request has been processed, the intermediate server SPV transmits a relay request to the identified source server SS1, SS2, SS3 or SS4 so as to receive the requested information. In certain embodiments, the relay requests are transmitted in source formats compatible with the identified source servers SS1, SS2, SS3, SS4. To sum up, the relay requests correspond to the initial requests apart from the fact that they are in a source format which can be understood by the identified source server. In certain embodiments, the transmission of the relay requests is carried out using processors, computer applications or any other equivalent software/hardware usually used by the person skilled in the art and integrated in the central processing unit UC of the intermediate server SPV. Referring to FIG. 3 or 4, the intermediate server SPV may be equipped with a connector C capable of establishing a connection to the identified source server.

In certain embodiments, the identified source server SS1, SS2, SS3 or SS4 analyzes the relay request received and extracts the requested information from its memory zone. In certain embodiments, the analysis of the relay requests and the extraction of the requested information are carried out in a manner known to the person skilled in the art, using processors, controllers, programs or any other equivalent software/hardware integrated in the source servers. In practice, the relay requests may contain a code or a code part, which allows to locate the requested information in the memory zones.

In certain embodiments, once the relay request has been processed, the source server SS1, SS2, SS3 or SS4 transmits the requested information in the source format to the intermediate server SPV. In certain embodiments, the transmission of the requested information is carried out in a manner known to the person skilled in the art, using processors, computer applications or any other equivalent software/hardware integrated in the source servers. In general, the information and relay requests exchanged between the intermediate server TM and the source servers SS1, SS2, SS3, SS4 go through the information channels associated with said source servers, respectively Ci1, Ci2, Ci3, Ci4. In certain embodiments, the information and relay requests go through these channels according to communication protocols and source formats specific to the source servers SS1, SS2, SS3, SS4.

In certain embodiments, when the intermediate server SPV receives the requested information in source formats, it converts said information to target format. In certain embodiments, this conversion is carried out using processors, computer applications or any other equivalent software/hardware integrated in the central processing unit UC of the intermediate server SPV. It will be understood that the intermediate server SPV is designed in such a way as to be able to process several types of source format.

In certain embodiments, as soon as the information has been converted to the target format, the intermediate server transmits said information to the mobile terminal TM. This transmission may be carried out in a manner known to the person skilled in the art, using processors, computer applications or any other equivalent software/hardware integrated in the central processing unit UC of the intermediate server SPV.

In certain embodiments, in order to establish the connection between the intermediate server SPV and the source servers SS1, SS2, SS3, it may be envisaged to provide a preliminary step in which said intermediate server transmits a relay presence request to the relevant source server SS1, SS2, SS3 or SS4. The relay presence request may be transmitted by means of a computer application integrated in the central processing unit UC of the intermediate server SPV or by any other equivalent means usually used by the person skilled in the art. In certain embodiments, after analysis and verification of the identification information of the user, the relevant source server SS1, SS2, SS3, SS4 authorises the connection to the intermediate server SPV. The relay presence requests may be similar to the initial presence request transmitted by the mobile terminal TM and may contain information which allows to identify the user. Transmitting relay presence requests similar to the initial presence request transmitted by the mobile terminal TM obviates the need to modify the identification protocols integrated in the existing source servers. In certain embodiments, the relay presence requests are in a source format compatible with the relevant source server SS1, SS2, SS3 or SS4. The intermediate server SPV is therefore perceived by the source servers SS1, SS2, SS3, SS4 as being the mobile terminal TM. The intermediate server SPV therefore corresponds virtually to the mobile terminal TM.

In certain embodiments, in the communication network of the invention, the intermediate server SPV is designed to receive information in the source formats from the source servers SS1, SS2, SS3, SS4; to convert to the target format the information received in the source formats; and to transmit the information in the target format to the mobile terminal TM. That the intermediate server SPV receives the initial requests in the target format, and converts them to the source format so as to transmit relay requests to the identified source servers, are optional steps. It may be provided that the source servers SS1, SS2, SS3, SS4 are designed to process directly the initial requests in the target format which are transmitted by the mobile terminal TM. This processing of the initial requests may be carried out using processors, computer applications or any other equivalent software/hardware integrated in the source servers SS1, SS2, SS3, SS4. In this embodiment:

either the mobile terminal TM transmits directly the initial requests to the relevant source servers, or the intermediate server SPV intercepts the initial request(s) and redirects it (them) as such (i.e. in the target format) to said source servers. In the latter case, the intermediate server SPV is designed in the manner of a "gateway" with regard to the initial requests.

Exemplary embodiments of the invention will now be described in greater detail with reference to FIGS. 3 to 7. In certain embodiments, the mobile terminal TM is preferably designed to display on its screen the different functionalities offered (MAIL, IM, BLOG or other) as contacts (or "buddies") in its list of instant messaging contacts (or "buddy list"). To do this, the mobile terminal TM may integrate a computer application for instant messaging IM. For the developers, this computer application for instant messaging IM may be the only application to be integrated in the mobile terminal TM.

In practice, as soon as the user decides to access the different functionalities offered (via the menu of his mobile terminal TM), the screen displays a list of instant messaging contacts which contains: his actual contacts (screen zone Z1) and the functionalities MAIL, BLOG or other (screen zone Z2). This enriched list of contacts may be in HTML format, or in another format conventionally used in instant messaging.

In certain embodiments, to launch the functionality, the user writes the name of the functionality in the text writing zone ZT of the mobile terminal TM. For example, he will type the word "MAIL" if he wishes to use the MAIL functionality, or the word "BLOG" if he wishes to use the BLOG functionality, etc. In one variant embodiment which is not illustrated in a Figure, the functionalities MAIL, BLOG, etc. may be associated with numbers, symbols or more generally with predefined text messages. In this case, the user may write in the text zone ZT the text message associated with the functionality which he wishes to use. This text message may then be sent to the intermediate server SPV in the target format, for example in the HTML format. It will be understood that the text message sent corresponds to an initial request.

In certain embodiments, in order to use the instant messaging IM, it is sufficient for the user to write in the text zone ZT the name of the contact(s) C1, C2, C3, C4 with whom he wishes to communicate, then to send this text message (in the target format, for example in the HTML format) to the intermediate server SPV. In practice, the user may use the IM function in the same way as what is known in the art.

Example 1

Referring to FIG. 3, in the case where the text message sent is "MAIL" (or a text message associated with the MAIL function), the intermediate server SPV is capable of "understanding" this message so as to establish a connection to the corresponding source server MAIL SS2. A similar functioning is obtained when the text message that is sent corresponds to the BLOG function or to another function.

Example 2

Referring to FIG. 4, in the case where the text message sent corresponds to the name of the contact(s) C1, C2, C3, C4 (FIG. 4), the intermediate server SPV is capable of "understanding" this message so as to establish a connection to the corresponding source server IM SS1.

In order to understand the text messages that it receives, the intermediate server SPV advantageously comprises a memory zone in which these text messages are associated with the relay requests designed to be transmitted to the source servers SS1, SS2, SS3, SS4. For example, when it receives the text message (in the target format) associated with the MAIL function, the intermediate server SPV comprises software capable of analyzing this text message and of associating it with the relay request destined for the source server MAIL SS2 (the relay request being directly in the source format associated with this source server). Likewise, when the intermediate server SPV receives the text message associated with an actual contact C1 of the "buddy list", the intermediate server SPV analyzes this text message and associates it with the relay request destined for the source server IM SS1.

These different steps are shown schematically in Examples 3 and 4.

Example 3

Figure 5:
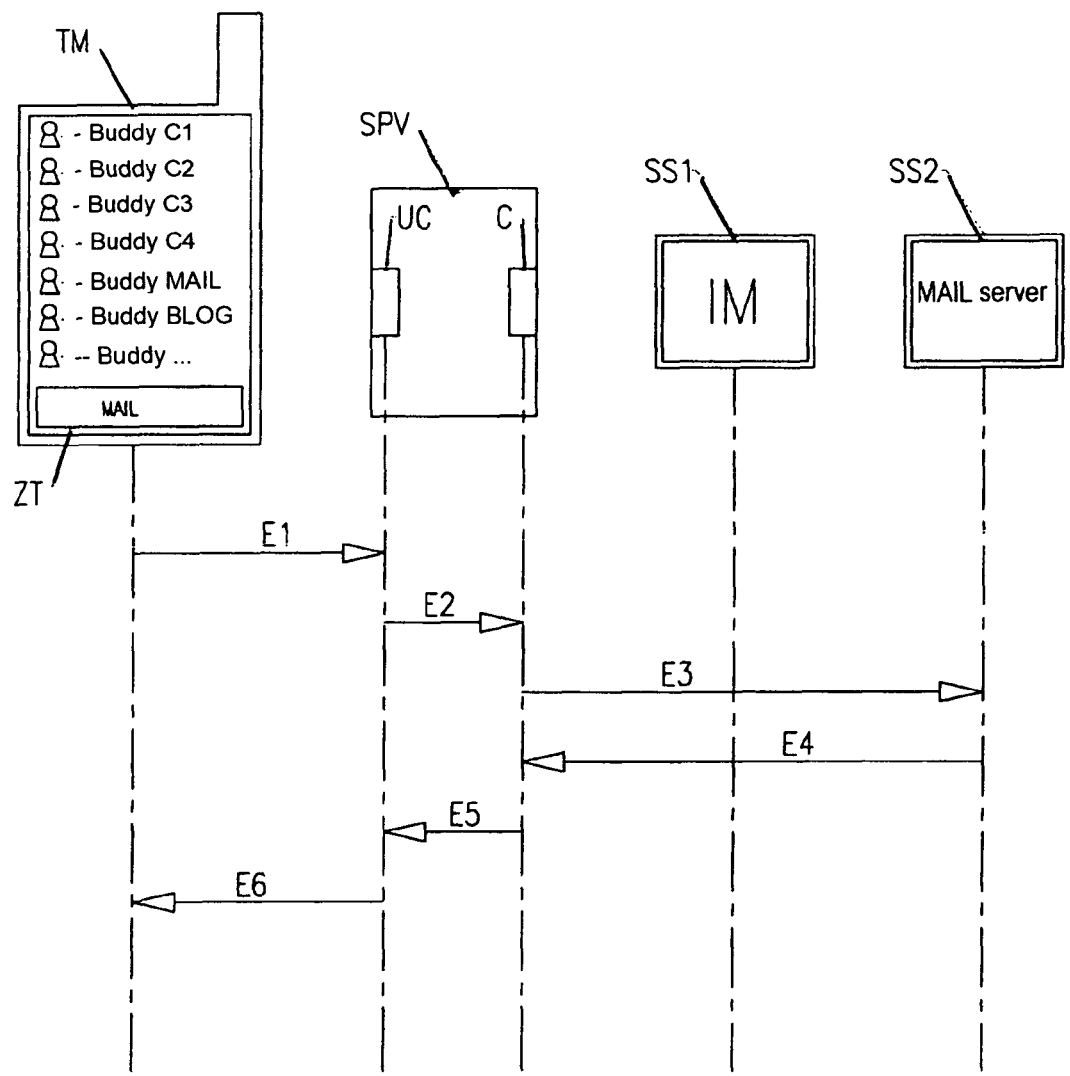
FIGS. 5 and 6 illustrate different steps of an exemplary method according to the invention, FIG. 7 schematically shows, chronologically, different screenshots of a screen of an exemplary mobile terminal according to the invention.

In FIG. 5, the mobile terminal TM transmits the text message "MAIL" to the intermediate server SPV (step E1). The central processing unit UC of the intermediate server SPV analyzes the text message and understands that it relates to execution of the MAIL function and not an instant messaging contact. The intermediate server SPV then determines the relay request associated with the text message "MAIL" and directs connector C to establish a connection with the source server MAIL SS2 (step E2). The intermediate server SPV transmits the relay request to the source server MAIL SS2 (step E3). The latter processes the relay request and transmits the requested information to the intermediate server SPV (step E4). The central processing unit UC of the intermediate server SPV converts the information to the source format (step E5). The intermediate server SPV transfers this information to the mobile terminal TM (step E6).

Example 4

Figure 6:
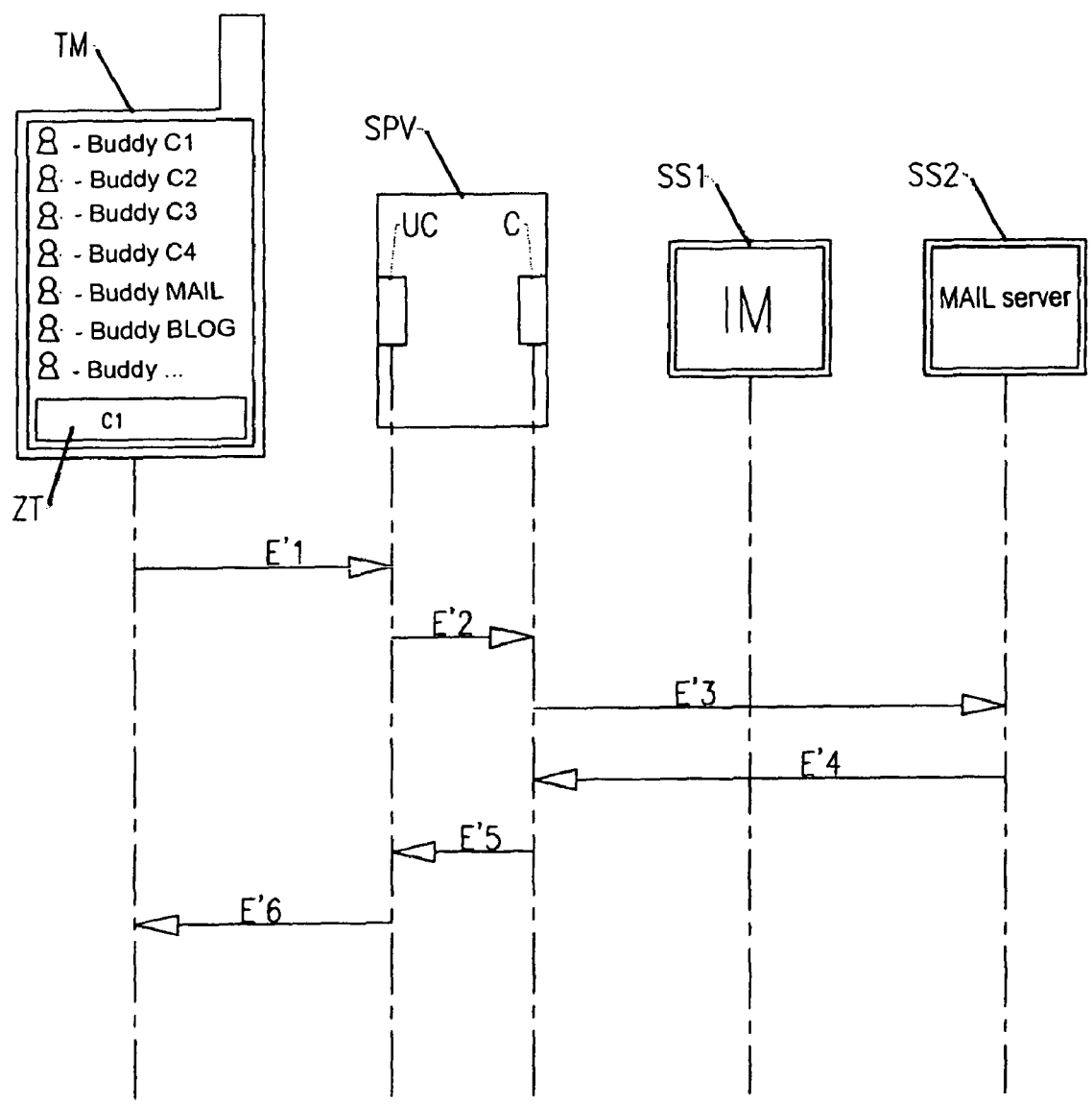

In the example shown in FIG. 6, the mobile terminal TM transmits the text message "C1" to the intermediate server SPV (step E'1). The central processing unit UC of the intermediate server SPV analyzes this text message and understands that it relates to a contact with whom the user wishes to converse. The intermediate server SPV then determines the relay request associated with the text message "C1" and directs connector C to establish a connection with the source server IM SS1 (step E'2). The intermediate server SPV transmits the relay request to the source server IM SS1 (step E'3). The latter processes the relay request and transmits the requested information to the intermediate server SPV (step E'4). The central processing unit UC of the intermediate server SPV converts the information to the source format (step E'5). The intermediate server SPV transfers this information to the mobile terminal TM (step E'6).

Example 5

Figure 7:
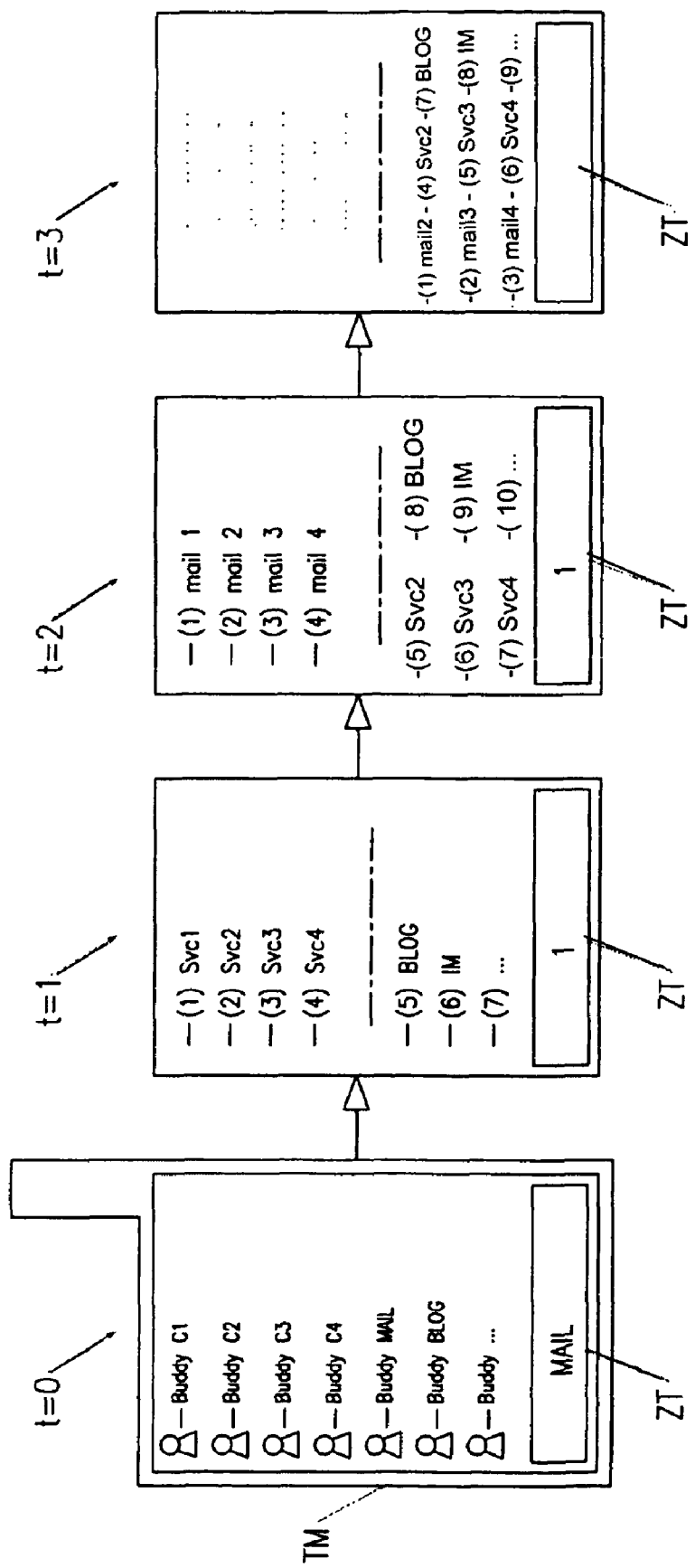

FIG. 7 schematically shows, in a chronological manner, different screenshots of the mobile terminal TM when it implements the MAIL function. Initially (t=0), the mobile terminal TM displays on its screen the different functionalities offered (MAIL, IM, BLOG or other) as contacts in its list of instant messaging contacts.

After the word "MAIL" has been written in the text zone ZT and this text message has been sent, different services Sv1, Sv2, Sv3, Sv4 are displayed (t=1). These services are displayed on the screen in the target format associated with instant messaging, i.e. in the form of a text document (optionally a rich text document). It will be understood that the list of these services corresponds to the information requested in the previous step (t=0) and that each service displayed corresponds to a new initial request. Each service Sv1, Sv2, Sv3, Sv4 corresponds to the e-mail services traditionally offered: receive/send e-mail Svc1, address book management Svc2, message rules Svc3, options Svc4, etc. Each of these services is associated with a dedicated text message (for example the number '1'→Svc1; '2'→Svc2; '3'→Svc3; '4'→Svc4; etc.). In order to select the desired service, the user writes in the text zone ZT the number which corresponds to this service. In the example of FIG. 7, the user writes the number 1 corresponding to receive/send e-mails.

After the number "1" has been written in the text zone ZT and this text message has been sent, the list of e-mails is displayed (t=2). These e-mails are displayed on the screen in the form of a text document. It will be understood that the list of these e-mails corresponds to the information requested in the previous step (t=1) and that each e-mail corresponds to a new initial request. Each e-mail is associated with a dedicated text message (for example '1'→e-mail 1; '2'→e-mail 2; '3'→e-mail 3; '4'→e-mail 4; etc.). In order to select the e-mail that he wishes to read, the user writes in the text zone ZT the number which corresponds to this e-mail. In the example of FIG. 7, the user writes the number 1 corresponding to the reading of e-mail 1.

After the number "1" has been written in the text zone ZT and this text message has been sent, the text of e-mail 1 is displayed (t=3). This e-mail is displayed on the screen in the form of a text document. It will be understood that the text of e-mail 1 corresponds to the information requested in the previous step (t=2). In order to select the desired functionality, the user writes in the text zone ZT the number which corresponds to this function.

It is important that the user can have access at any time to the other functionalities and/or services and/or e-mails that had been communicated to him. To this end, at each new step, the information previously communicated is again recalled and written on the screen of the mobile terminal TM. For example, on the second screen (t=1), the functions BLOG, IM or others are still offered. These functions are associated with a dedicated text message: for example, the number '5' blog; '6' IM; '7' etc. In order to select the desired functionality, the user writes in the text zone ZT the number which corresponds to this functionality. The same applies for each successive screen.

It will be understood that it is advantageous if the intermediate server SPV is designed to store in its memory the chronology of the different initial requests transmitted by the mobile terminal TM so that one and the same text message can be associated with different relay requests according to the point in time at which said initial requests are transmitted by said mobile terminal. In the example of FIG. 7, it will be noted that the number '1' is associated at t=1 with the service SV1, at t=2 with e-mail 1 and at t=3 with e-mail 2. In practice, the central processing unit UC of the intermediate server SPV allows to implement this function.

The invention claimed is:

1. A communication network comprising:
a mobile terminal designed to receive information in a target format;
source servers designed to deliver information in source formats; and
an intermediate server, which is independent of the source servers, arranged between the mobile terminal and the source servers so that the information destined for the mobile terminal goes through the intermediate server, wherein the intermediate server is designed to:
receive information in the source formats from the source servers,
convert, to the target format, the information received in the source formats,
transmit the information in the target format to the mobile terminal,
analyze a first initial request sent by the mobile terminal at a first time, the first initial request including a first message,
use a memory zone of the intermediate server to store a mapping from the first message to different relay requests according to times at which the first message is received,
identify one of the source servers in response to the first initial request,
determine a first relay request from the memory zone in response to the first initial request and the first time, and
transmit the first relay request to the identified source server to receive information in the source formats from the identified source server,
wherein the initial requests displayed on a screen of the mobile terminal are associated with predefined text messages, the memory zone associating the text messages with relay requests designed to be transmitted to the source servers in order to receive the requested information, and
wherein the intermediate server is designed to store in its memory chronology of different initial requests transmitted by the mobile terminal so that one and the same text message can be associated with different relay requests according to the point in time at which the initial requests are transmitted by the mobile terminal.

2. The network of claim 1, wherein:
the first initial request is in the target format, and
the intermediate server is designed to transmit the first relay request to the identified source server in source formats compatible with the identified source server.

3. The network of claim 1, wherein:
the first initial request is in the target format,
the source servers are designed to process directly the first initial request in the target format transmitted by the mobile terminal, and
the intermediate server is designed to intercept the first initial request and to redirect the first initial request as such to the identified source server.

4. The network of claim 1, wherein the mobile terminal integrates a computer application for instant messaging, the target format being a format used for instant messaging, all the information and requests exchanged between the mobile terminal and the intermediate server going only through one information channel used for instant messaging.

5. The network of claim 4, wherein all the information and requests exchanged between the mobile terminal and the intermediate server are in HTML format.

6. The network of claim 4, wherein:
the first initial request is in the target format;
the intermediate server is designed to transmit the first relay request in source formats compatible with the identified source server; and
the mobile terminal is designed to display on its screen a set of initial requests as contacts in a list of instant messaging contacts.

7. The network of claim 4, wherein:
the first initial request is in the target format,
the source servers are designed to process directly the first initial request in the target format transmitted by the mobile terminal,
the intermediate server is designed to intercept the first initial request and to redirect the first initial request as such to the source servers; and
the mobile terminal is designed to display on its screen a set of initial requests as contacts in a list of instant messaging contacts.

8. The network of claim 1, wherein the intermediate server is designed to transmit to the mobile terminal, at the same time as the requested information, a list of initial requests which is designed to be displayed in the form of text messages on the screen of the mobile terminal.

9. The network of claim 1, wherein:
the mobile terminal is designed to transmit an initial presence request to the intermediate server, the initial presence request containing identification information of the user of the terminal, and
the intermediate server is designed to analyze the identification information of the user and, after verification, to authorize the connection to the mobile terminal and to allocate a memory space in which it will store a copy of the information and requests that will circulate.

10. The network of claim 1, wherein:
the intermediate server is designed to transmit relay presence requests to the source servers, the relay presence requests being in a source format associated with the source servers and containing identification information of the user of the mobile terminal, and
the source servers are designed to analyze the identification information of the user and, after verification, to authorize the connection to the intermediate server.

11. The network of claim 10, wherein:
the mobile terminal is designed to transmit an initial presence request to the intermediate server, the initial presence request containing identification information of the user of the terminal,
the intermediate server is designed to analyze the identification information of the user and, after verification, to authorize the connection to the mobile terminal and to allocate a memory space in which it will store a copy of the information and requests that will; circulate, and
the relay presence requests transmitted by the intermediate server are similar to the initial presence request transmitted by the terminal so that the intermediate server is perceived by the source servers as being the mobile terminal.

12. A mobile terminal equipped with the screen and integrating a computer application for instant messaging, this terminal being designed to exchange information with a plurality of source servers in the communication network of claim 1, wherein the mobile terminal is designed to display requests on its screen as contacts in its list of instant messaging contacts, the requests being associated with predefined text messages.

13. The network of claim 1, wherein the intermediate server is designed to:
analyze a second initial request sent by the mobile terminal at a second time, the second initial request including the first message;
determine a second relay request from the memory zone in response to the second initial request and the second time, the second relay request being different from the first relay request; and
transmit the second relay request to one of the source servers.

14. A method comprising:
at a mobile terminal, receiving information in a target format;
delivering information from source servers in source formats;
connecting the mobile terminal to an intermediate server that is independent of the source servers;
intercepting, at the intermediate server, information from the source servers that is destined for the mobile terminal;
transmitting information in the source format from the source server to the intermediate server;
in the intermediate server, converting the information received in the source format to the target format;
transmitting the information in the target format from the intermediate server to the mobile terminal;
from the mobile terminal, transmitting a first initial request to the intermediate server at a first time, the first initial request being in the target format and including a first message;
in a memory zone of the intermediate server, storing a mapping from the first message to different relay requests according to times at which the first message is received;
in the intermediate server, analyzing the first initial request received and identifying the source server in which the requested information is available;
in the intermediate server, determining a first relay request from the memory zone in response to the first initial request and the first time;
from the intermediate server, transmitting the first relay request to the identified source server in order to receive the requested information, the relay request being transmitted in a source format compatible with the identified source server, wherein the initial requests displayed on a screen of the mobile terminal are associated with predefined text messages;
in the intermediate server, associating the predefined text messages with the relay requests designed to be transmitted to the source servers in order to receive the requested information; and
storing chronology of different initial requests transmitted by the mobile terminal in a memory in the intermediate server so that one and the same text message can be associated with different relay requests according to the point in time at which the initial requests are transmitted by the mobile terminal.

15. The method of claim 14, wherein:
the first initial request is in the target format, and
the first relay request is transmitted in a source format compatible with the identified source server.

16. The method of claim 14, wherein the first initial request is in the target format, the method further comprising:
in the source server, directly processing the first initial request in the target format transmitted by the mobile terminal, and
at the intermediate server, intercepting the first initial request and redirecting the first initial request as such to the source server.

17. The method of claim 14, wherein the mobile terminal integrates a computer application for instant messaging, the target format being a format used for instant messaging, all the information and requests exchanged between the mobile terminal and the intermediate server passing only through one information channel used for instant messaging.

18. The method of claim 17, wherein all the information and requests exchanged between the mobile terminal and the intermediate server are in HTML format.

19. The method of claim 17, wherein:

the first initial request is in the target format;

the first relay request is transmitted in a source format compatible with the identified source server; and the method further comprises displaying initial requests on the screen of the mobile terminal as contacts in a list of instant messaging contacts.

20. The method of claim 19, wherein the transmission of an initial request is carried out by inputting a predefined text message associated with the request in the text writing zone of the mobile terminal, the method further comprising transmitting the text message to the intermediate server.

21. The method of claim 17 wherein the first initial request is in the target format, the method further comprising: in the source server, directly processing the first initial request in the target format transmitted by the mobile terminal;

in the intermediate server intercepting the first initial request and redirecting the first initial request as such to the source server; and displaying a set of initial requests on the screen of the mobile terminal as contacts in a list of instant messaging contacts.

22. The method of claim 14, further comprising transmitting, from the intermediate server to the mobile terminal, at the same time as the requested information, a list of initial requests which is designed to be displayed in the form of text messages on the screen of the mobile terminal.

23. The method of claim 14, further comprising:

when the user of the mobile terminal wishes to connect to the intermediate server, transmitting beforehand an initial presence request from the mobile terminal to the intermediate server, the initial presence request containing identification information of the user of the terminal, in the intermediate server, analyzing the identification information of the user and, after verification, authorizing the connection to the mobile terminal and allocating a memory space in which a copy of the information and requests that will circulate will be stored.

24. The method of claim 14, further comprising:

in order to establish a connection between the intermediate server and a source server, the transmitting beforehand a relay presence request from the intermediate server to the source server, the relay presence request being in a source format associated with the source server and containing identification information of the user of the mobile terminal, in the source server, analyzing the identification information of the user and, after verification, authorizing the connection to the intermediate server.

25. The method of claim 14, further comprising:

in the intermediate server, analyzing a second initial request sent by the mobile terminal at a second time, the second initial request including the first message;

in the intermediate server, determining a second relay request from the memory zone in response to the second initial request and the second time, the second relay request being different from the first relay request; and from the intermediate server, transmitting the second relay request to one of the source servers.

* * * * *